United States Patent Office 3,502,671
Patented Mar. 24, 1970

3,502,671
SELECTED N-SUBSTITUTED DIAZOLES AND DIAZINES AND PROCESSES FOR PREPARING SAME
Edward B. Hodge, Terre Haute, Ind., assignor to Commercial Solvents Corporation, a corporation of Maryland
No Drawing. Filed Mar. 2, 1964, Ser. No. 348,779
Int. Cl. C07d 51/18, 49/30
U.S. Cl. 260—251                 20 Claims

ABSTRACT OF THE DISCLOSURE

Compounds having the formula

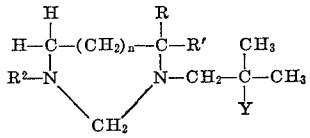

and methods of preparing such compounds by reacting a polyamine, formaldehyde and 2-nitropropane. R and R' are hydrogen or lower alkyl, Y is $NO_2$ or $NH_2$, $n$ is 0 or 1, and $R^2$ is a radical containing from about 1 to 25 carbon atoms selected from the group consisting of aryl, alkyl, cycloalkyl and

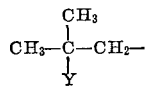

---

This invention relates to novel compounds and to their production. The novel compounds of the present invention are of the structural formula

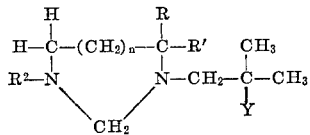

where R is hydrogen or alkyl, e.g. lower alkyl; R' is hydrogen or alkyl, e.g. lower alkyl; $n$ is 0 or 1; Y is $NO_2$ or $NH_2$; and $R^2$ is a substituted or unsubstituted hydrocarbon radical generally containing from about 1 to 25 carbon atoms, such as aryl, e.g. phenyl, tolyl, xylyl and naphthyl, alkyl, e.g. dodecyl and lower alkyl, e.g. methyl, ethyl, butyl and amyl, cyloalkyl, e.g. cyclohexyl and cycyopentyl and the radical

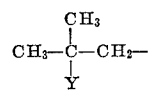

where Y is $NO_2$ or $NH_2$.

In addition to use as intermediaries in the production of amino compounds, the novel nitro compounds of the present invention exhibit antibacterial and antifungal activity. The amino compounds may be used as oil additives or as corrosion inhibitors.

The process of the present invention for the production of such nitro and amino compounds can be illustrated by reference to the preparation of 1,3-bis(2-nitroisobutyl)imidazolidine and 1,3-bis(2-aminoisobutyl)imidazolidine. One mole of ethylenediamine is reacted with about three moles of formaldehyde and about two moles of 2-nitropropane. The reaction which occurs can be represented by the following equation.

Equation I

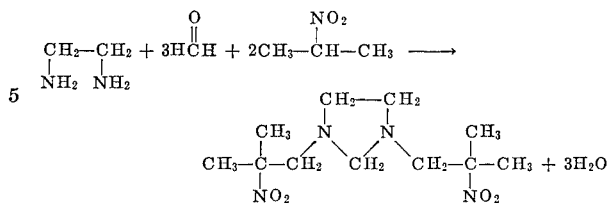

After the reaction, the 1,3-bis(2-nitroisobutyl)imidazolidine can be isolated from the reaction mixture if it is the desired product. If, however, 1,3-bis(2-aminoisobutyl)imidazolidine is the desired product, the 1,3-bis(2-nitroisobutyl)imidazolidine, either in the reaction mixture or in separated form, is reduced with hydrogen and 1,3-bis(2-aminoisobutyl)imidazolidine is isolated from the resulting reaction mixture. The reduction process is represented by the following equation.

Equation II

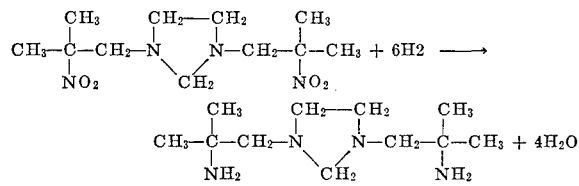

In place of ethylenediamine, other amines, including substituted diamines and polyamines, can be used to give analogous compounds. Such amines and polyamines may be represented by the general structural formula

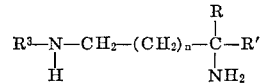

where R, R', and $n$ have the same meaning given above and $R^3$ is hydrogen or a substituted or unsubstituted hydrocarbon radical corresponding to $R^2$ described above as generally containing from about 1 to 25 carbon atoms, such as aryl, e.g., phenyl, tolyl, xylyl and naphthyl, alkyl, e.g., dodecyl and lower alkyl, e.g., methyl, ethyl, butyl and amyl, cycloalkyl, e.g., cyclohexyl and cyclopentyl. Examples of such amino and substituted amino compounds include ethylenediamine, 1,2 - propanediamine, 1,3-propanediamine, 1,2-butanediamine, $N^1$-isopropyl-2-methyl-1,2-propanediamine, $N^1$-cyclohexyl-2-methyl-1,2-propanediamine, $N^1$-phenylethylenediamine, etc.

As illustrated by the general formula used above to designate the amine used in the reaction of the present invention, the present invention is not limited to the production of 1,3-bis(nitroalkyl)-imidazolidines, i.e. compounds from amines having two primary amino groups. Amines having one primary amino group and a secondary amino group, i.e. —$NHR^3$, cyclize with the addition of the nitro compound at the primary amino group.

The molar proportions of the reactants used vary according to the amine starting material. When an amine having two primary amino groups is used as the starting material, about two moles of the nitroalkane and about three moles of formaldehyde are used in the reaction for each mole of amine to be reacted. If the amine contains a secondary amino group, generally about 1 mole of the nitro compound and two moles of formaldehyde are used per mole of amine.

The reaction of the present invention can be considered substantially complete when about three moles, or two, respectively, of the aldehyde have been consumed for each mole or amine. The time necessary for completion of the reaction depends principally upon the starting materials, temperature, etc. and is usually from about 0.5 to about 8 hours. Generally from about 2 to 4 hours is sufficient.

The reaction of the present invention is conveniently carried out at a temperature somewhat above the melting point of the desired product, usually from room temperature to about 150° C., and preferably from about 50° to 120° C. After completion of the reaction, the reaction mixture may be cooled and the nitro compound separated from the reaction mixture by filtration, for example. The compounds may be separated from the reduction mixture produced according to Equation II by distillation or careful rectification of the reduction mixture. The reduction can be accomplished by contacting the nitro compound with sufficient hydrogen in the presence of a reducing catalyst e.g. Raney nickel, under hydrogenation conditions generally including temperatures from about 30 to 120° C. and pressures from about atmospheric to 1500 p.s.i.

EXAMPLES I-V

The following procedure shown with reference to the production of 1,3-bis(2-nitroisobutyl)imidazolidine and 1,3-bis(2-aminoisobutyl)imidazolidine is followed for each of Examples I through V and summarized in Tables I and II.

Production of 1,3-bis(2-nitroisobutyl)imidazolidine

To 222 ml. of 37% aqueous formaldehyde solution and 180 g. of 2-nitropropane in a stirred 3-necked flask, 77 gms. of a 78% solution of ethylenediamine was added slowly at 55 to 60° C. The reaction mixture was stirred with slight heating to hold the temperature at 55 to 60° C. for 3 hours, then it was cooled for 2 hours in the refrigerator. The cooled mixture was filtered and 261 gms. of white 1,3-bis(2-nitroisobutyl)imidazolidine crystals melting at 49 to 55° C. were recovered. These could be conveniently recrystallized from isopropyl alcohol.

In cases where the nitroamine was not a solid the organic layer of the reaction mixture was concentrated at reduced pressure, but not further purified.

Production of 1,3-bis(2-aminoisobutyl)imidazolidine

One hundred and thirty-seven grams of 1,3-bis(2-nitroisobutyl)imidazolidine in 600 ml. of methanol was reduced at 40° C. and 1000 p.s.i. of hydrogen in the presence of 25 gms. of Raney nickel for about 4 hours. The reduction mixture was filtered and concentrated at reduced pressure to give 101 gms. of product. This was then distilled at as high a vacuum as could be obtained (about 200 to 400 microns) to give a 69 gm. cut of 1,3-bis(2-aminoisobutyl) imidazolidine boiling at 115 to 118° C.

(NaCl) at 43° C. for one week. Two strips were in each large test tube which contained 175 ml. of the brine solution. Varying amounts of $N^1$, $N^3$-bis(2-aminoisobutyl) imidazolidine were present in the tubes. The strips were weighed before and after the week's exposure and the average weight loss per strip was calculated and found to be:

| Inhibitor content (p.p.m.): | Average wt. loss (percent) |
|---|---|
| 0 | 0.051 |
| 500 | 0.043 |
| 1000 | 0.042 |
| 1500 | 0.025 |

These figures show that 1500 p.p.m. of $N^1$, $N^3$-bis (2-aminoisobutyl)imidazolidine reduced the corrosion rate by about one-half under the conditions of the experiment.

It is claimed:
1. Compounds having the formula

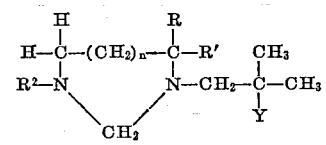

where R is selected from the group consisting of hydrogen and lower alkyl, R' is selected from the group consisting of hydrogen and lower alkyl, Y is selected from the group consisting of $NO_2$ and $NH_2$, n is an integer selected from the group consisting of 0 and 1, and $R^2$ is a radical selected from the group consisting of cyclohexyl and alkyl hydrocarbon radicals of about 1 to 25 carbon atoms and radicals of the formula

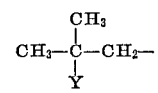

where Y has the same meaning given above.
2. The compounds of claim 1 wherein Y is $NO_2$.
3. The compounds of claim 1 wherein Y is $NH_2$.
4. The compound having the formula

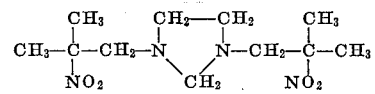

5. The compound having the formula

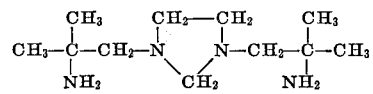

TABLE I.—NITROAMINES FROM AMINES, 2-NITROPROPANE (2-NP) AND FORMALDEHYDE (CH₂O)

| Example | Amine | Moles 2-NP | Moles CH₂O | Yield, percent | M.P., °C. | Percent N Theory | Percent N Found | Percent C Theory | Percent C Found | Percent H Theory | Percent H Found |
|---|---|---|---|---|---|---|---|---|---|---|---|
| I | Ethylenediamine | 2 | 3 | 95 | 61-63 | 20.43 | 20.35 | 48.16 | 48.28 | 8.09 | 7.98 |
| II | 1,2-propanediamine | 2 | 3 | 93 | | 19.43 | 19.85 | | | | |
| III | 1,3-propanediamine | 2 | 3 | 83 | 60-64 | 19.43 | 19.35 | 49.98 | 50.11 | 8.39 | 8.58 |
| IV | N¹-isopropyl-2 methyl-1,2-propanediamine | 1 | 2 | 98 | | 17.34 | 17.19 | 59.23 | 58.83 | 10.36 | 9.83 |
| V | N¹-cyclohexyl-2-methyl-1,2-propanediamine | 1 | 2 | 97 | | 14.83 | 14.97 | | | | |

TABLE II.—AMINES FROM CORRESPONDING NITROAMINES OF TABLE I

| | Yield, percent | B.P., °C. at microns | Percent N Theory | Percent N Found | Neut. Eq. Theory | Neut. Eq. Found |
|---|---|---|---|---|---|---|
| Nitroamine example: | | | | | | |
| IB | 58 | 115-118, 200-400 | 26.14 | 26.23 | 53.6 | |
| IIIB | 67 | 103-116, 220 | 24.53 | 24.75 | 57.1 | 58.6 |
| IVB | 64 | 89-97, 550 | 19.69 | 20.24 | 71.1 | 73.1 |
| VB | 57 | 106-109, 170 | 16.58 | 16.92 | 84.5 | |

The following illustrate the advantageous corrosion inhibiting characteristics for instance on a metal, e.g. steel, surface provided by the novel compounds of the present invention.

Corrosion tests were carried out on polished ½" x 4" carbon steel (No. 1010) strips immersed in 5% brine 6. The compound having the formula

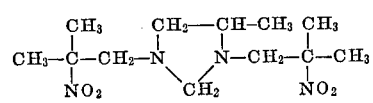

7. The compound having the formula $$CH_3-\underset{NO_2}{\underset{|}{\overset{CH_3}{\overset{|}{C}}}}-CH_2-N\underset{CH_2}{\overset{CH_2}{\diagup}}\underset{CH_2}{\overset{CH_2}{\diagdown}}N-CH_2-\underset{NO_2}{\underset{|}{\overset{CH_3}{\overset{|}{C}}}}-CH_3$$

8. The compound having the formula $$CH_3-\underset{NH_2}{\underset{|}{\overset{CH_3}{\overset{|}{C}}}}-CH_2-N\underset{CH_2}{\overset{CH_2}{\diagup}}\underset{CH_2}{\overset{CH_2}{\diagdown}}N-CH_2-\underset{NH_2}{\underset{|}{\overset{CH_3}{\overset{|}{C}}}}-CH_3$$

9. The compound having the formula $$\underset{CH_3}{\underset{|}{CH-N}}\overset{CH_3}{\overset{|}{\underset{CH_2}{\diagup}}}\overset{CH_2-\underset{|}{\overset{CH_3}{\overset{|}{C}}}-CH_3}{\underset{CH_2}{\diagdown}}N-CH_2-\underset{NO_2}{\underset{|}{\overset{CH_3}{\overset{|}{C}}}}-CH_3$$

10. The compound having the formula $$\underset{CH_3}{\underset{|}{CH-N}}\overset{CH_3}{\overset{|}{\underset{CH_2}{\diagup}}}\overset{CH_2-\underset{|}{\overset{CH_3}{\overset{|}{C}}}-CH_3}{\underset{CH_2}{\diagdown}}N-CH_2-\underset{NH_2}{\underset{|}{\overset{CH_3}{\overset{|}{C}}}}-CH_3$$

11. The compound having the formula (bicyclic structure with $NO_2$ terminus)

12. The compound having the formula (bicyclic structure with $NH_2$ terminus)

13. The compounds of claim 1 wherein $R^2$ is lower alkyl.

14. The compounds of claim 1 wherein $R^2$ is a cyclohexyl radical.

15. The compounds of claim 1 wherein $R^2$ is $$CH_3-\underset{Y}{\underset{|}{\overset{CH_3}{\overset{|}{C}}}}-CH_2-$$

16. A process for producing the compounds of claim 2 comprising reacting an amine having the formula $$R^3-\underset{H}{\underset{|}{N}}-CH_2-(CH_2)_n-\underset{NH_2}{\underset{|}{\overset{R}{\overset{|}{C}}}}-R'$$

where R, R', and n have the same meaning as in claim 2 and $R^3$ is selected from the group consisting of hydrogen, cyclohexyl and alkyl hydrocarbon radicals of about 1 to 25 carbon atoms with from about 2 to 3 moles of formaldehyde and from about 1 to 2 moles of 2-nitropropane for each mole of an amine, under reaction conditions including temperatures from about room temperature to 150° C. to produce the compounds of claim 2.

17. A process for producing the compounds of claim 13 wherein Y is $NO_2$ comprising reacting an amine having the formula $$R^3-\underset{H}{\underset{|}{N}}-CH_2-(CH_2)_n-\underset{NH_2}{\underset{|}{\overset{R}{\overset{|}{C}}}}-R'$$

where R and R' are each selected from the group consisting of hydrogen and lower alkyl, n is an integer selected from the group consisting of 0 and 1 and $R^3$ is lower alkyl, with about 2 moles of formaldehyde and about 1 mole of 2-nitropropane for each mole of said amine, under reaction conditions including temperatures from about room temperature to 150° C. to produce the compounds of claim 15 wherein Y is $NO_2$.

18. A process for producing the compounds of claim 14 wherein Y is $NO_2$ comprising reacting an amine having the formula $$R^3-\underset{H}{\underset{|}{N}}-CH_2-(CH_2)_n-\underset{NH_2}{\underset{|}{\overset{R}{\overset{|}{C}}}}-R'$$

where R and R' are each selected from the group consisting of hydrogen and lower alkyl, n is an integer selected from the group consisting of 0 and 1, and $R^3$ is cyclohexyl, with about 2 moles of formaldehyde and about 1 mole of 2-nitropropane for each mole of said amine, under reaction conditions including temperatures from about room temperature to 150° C. to produce the compounds of claim 16 wherein Y is $NO_2$.

19. A process for producing the compounds of claim 15 wherein Y is $NO_2$ comprising reacting an amine having the formula $$H-\underset{H}{\underset{|}{N}}-CH_2-(CH_2)_n-\underset{NH_2}{\underset{|}{\overset{R}{\overset{|}{C}}}}-R'$$

where R and R' are each selected from the group consisting of hydrogen and lower alkyl and n is an integer selected from the group consisting of 0 and 1 with about 3 moles of formaldehyde and about 2 moles of 2-nitropropane for each mole of said amine, under reaction conditions including temperatures from about room temperature to 150° C. to produce the compounds of claim 17 wherein Y is $NO_2$.

20. A process for producing a compound of claim 3 which comprises reacting an amine having the formula $$R^3-\underset{H}{\underset{|}{N}}-CH_2-(CH_2)_n-\underset{NH_2}{\underset{|}{\overset{R}{\overset{|}{C}}}}-R'$$

wherein R, R' and n have the same meaning as in claim 3 and $R^3$ is selected from the group consisting of hydrogen, cyclohexyl and alkyl hydrocarbon radicals of about 1 to 25 carbon atoms, with about 2 to 3 moles of formaldehyde and about 1 to 2 moles of 2-nitropropane for each mole of said amine, under reaction conditions including temperatures from about room temperature to 150° C. to produce a compound having the formula $$R^2-N\underset{CH_2}{\overset{CH_2-(CH_2)_n-\underset{NH_2}{\underset{|}{\overset{R}{\overset{|}{C}}}}-R'}{\diagup}}\underset{}{\overset{}{\diagdown}}N-CH_2-\underset{NO_2}{\underset{|}{\overset{CH_3}{\overset{|}{C}}}}-CH_3$$

wherein R, R', $R^2$ and n have the same meaning as in claim 3, and contacting said last mentioned compound with hydrogen in the presence of a reducing catalyst under hydrogenation conditions including temperatures from about 30 to 120° C. and pressures from about atmospheric to 1500 p.s.i. to produce a compound of claim 3.

References Cited

UNITED STATES PATENTS 2,693,468   11/1954   Blair _____ 260—251

OTHER REFERENCES

Morrison et al., "Organic Chemistry," 1959, Allyn & Bacon, Inc., p. 529.

ALEX MAZEL, Primary Examiner

R. V. RUSH, Assistant Examiner

U.S. Cl. X.R.

252—50, 390; 260—256.4, 309.7, 999

PO-1050
(5/69)

UNITED STATES PATENT OFFICE
CERTIFICATE OF CORRECTION

Patent No. 3,502,671                    Dated March 24, 1970

Inventor(s)    Edward B. Hodge

It is certified that error appears in the above-identified patent and that said Letters Patent are hereby corrected as shown below:

Column 3, Table I, Line 9: "$N^1$-isopropyl-2 methyl-1,2-propanediamine" should be --$N^1$-isopropyl-2-methyl-1,2-propanediamine--.

Column 6, line 3: "15" should be --13--.

Column 6, line 18: "16" should be --14--.

Column 6, line 32: "17" should be --15--.

SIGNED AND
SEALED
AUG 25 1970

(SEAL)
Attest:

Edward M. Fletcher, Jr.
Attesting Officer

WILLIAM E. SCHUYLER, JR.
Commissioner of Patents